United States Patent [19]
Wakabayashi et al.

[11] Patent Number: 5,701,528
[45] Date of Patent: Dec. 23, 1997

[54] APERTURE STOP FOR A PHOTOMETRY UNIT OF A CAMERA

[75] Inventors: Hiroshi Wakabayashi, Yokohama; Kiyosada Machida, Saitama-ken, both of Japan

[73] Assignee: Nikon Corporation, Toyko, Japan

[21] Appl. No.: 801,528

[22] Filed: Feb. 18, 1997

Related U.S. Application Data

[63] Continuation of Ser. No. 383,100, Feb. 3, 1995, abandoned.

[30] Foreign Application Priority Data

Feb. 4, 1994 [JP] Japan ..................... 6-012736

[51] Int. Cl.$^6$ ........................................ G03B 7/08
[52] U.S. Cl. ........................................ 396/268
[58] Field of Search ........................................ 396/268

[56] References Cited

U.S. PATENT DOCUMENTS

| | | | |
|---|---|---|---|
| 5,136,326 | 8/1992 | Yokota et al. | 354/476 |
| 5,302,998 | 4/1994 | Kawano | 354/476 |

FOREIGN PATENT DOCUMENTS 62-41130  3/1987  Japan.

*Primary Examiner*—W. B. Perkey
*Attorney, Agent, or Firm*—Oliff & Berridge

[57] ABSTRACT

Attaching window glass to a window used in photometry without degrading the external appearance of a camera, with the aim of simplifying the photometric optical system. The device has a photometric unit which conducts photometry on the subject region and which is provided inside the housing of the camera, an aperture stop is formed integrally with the housing at a position in front of the photometry unit. The aperture stop restricts the amount of incidental light on the photometry unit. A window glass is attached, from the inside of the housing, to cover the aperture region of the aperture stop. Further, the aperture stop is provided with a tapered surface which is formed so that the aperture region expands from the outside of the housing to the inside.

16 Claims, 3 Drawing Sheets

APERTURE STOP FOR A PHOTOMETRY UNIT OF A CAMERA

This is a continuation of application Ser. No. 08/383,100 filed Feb. 3, 1995 now abandoned.

BACKGROUND OF THE INVENTION

1. Field of the Invention

The invention relates to a camera which conducts photometry on the subject field region.

2. Background of Related Art

Conventionally, a camera is known which is equipped with a photometry light-receiving window on the outer surface of the camera body (housing) in addition to the viewfinder window and the light-emitting and light-receiving window for auto-focus (AF).

FIG. 3 is a cross section showing the structure of an example of a conventional light-receiving window, the light-receiving window 51a being formed on the outer surface of the camera body 51. In addition, a photometry unit 52 comprised of a light-receiving element is provided within the camera body 51 and behind the light-receiving window 51a. Furthermore, a stop 51b is integrally formed with the camera body 51 in one portion of the aperture region of the light-receiving window 51a. Window glass 53 composed of transparent acrylic resin, for example, is attached to the light-receiving window 51a.

Incidental light from the light-receiving window 51a is restricted in terms of the amount of light by the stop 51b, so that a predetermined amount of light is received by the photometry unit 52.

However, the above-described conventional camera has problems.

The methods of attaching the window glass to the light-receiving window include a method of attaching it from the outside of the camera body and a method of attaching it from the inside of the camera body. In the case of the former method, it is difficult to anchor the window glass because the adhesive area cannot be sufficiently secured, for example when the window glass is adhered, because of the small aperture area in the light-receiving window. In addition, there is also a method whereby a large window glass is formed, and after a predetermined pattern is printed on an exterior frame portion, the glass is mounted with the printed surface comprising the adhesive surface, but costs increase due to the printing, and there is also the problem that the external appearance is not preferable because of the large size of the window glass.

On the other hand, when the window glass is attached from the inside of the camera body, the described problems are solved, but the problem arises that the structure becomes complicated because the stop is also positioned between the light-receiving window and the photometry unit.

SUMMARY OF THE INVENTION

In order to solve the described and other problems, it is an object of the invention to provide a way in which the window glass can be attached without damaging the beauty of the external appearance, while also simplifying the photometry optical system.

In order to achieve the above and other objectives, a camera comprising a photometry unit which conducts photometry on the subject region and which is provided in the camera housing is provided with an aperture stop which is integrally formed with the housing in an area positioned to the front of the photometry unit in the housing. The aperture stop restricts the amount of incidental light on the photometry unit at the outer surface of the housing.

Further the aperture stop may be provided with a tapered surface on at least one portion of the inner surface, the tapered surface formed so that the aperture region expands in the direction from the outer surface of the housing toward the inner surface.

When the tapered surface is provided, an irregular reflecting surface is provided on at least one portion of the tapered surface of the aperture stop.

An optically transparent body that is either transparent or half-transparent is provided so as to cover the aperture region of the aperture stop from the inner surface of the housing.

The irregular reflecting surface may be provided on at least one portion on the adhesion surface between the optically transparent body and the tapered surface of the aperture stop.

According to the invention, the aperture stop provided in the camera housing is comprised of the light-receiving window for photometry and the stop for the photometry unit. Accordingly, it is possible to simplify the photometry optical system and reduce costs.

According to the invention, incidental light from regions outside the photometric angle is reflected by the tapered surface and becomes stray light that is not received by the photometry unit. In addition, because incidental light on the tapered surface is reflected irregularly through the provision of an irregular reflecting surface on the described tapered surface it is further ensured that the incidental light is not received by the photometry unit. Accordingly, it is possible to boost photometric precision.

According to the invention, an optically transparent body is attached from the inner surface of the aperture stop, owing to which the external appearance is enhanced, while the optically transparent body can be attached after securing sufficient adhesion area.

According to one form of the invention, an irregular reflecting surface is provided on the optically transparent body, as a consequence of which it is possible to boost photometric precision as with the form where the irregular reflecting surface is placed on the tapered surface of the aperture stop.

BRIEF DESCRIPTION OF THE DRAWINGS

The invention will be described with reference to the drawings in which.

DETAILED DESCRIPTION OF THE PREFERRED EMBODIMENTS

Figure 1:
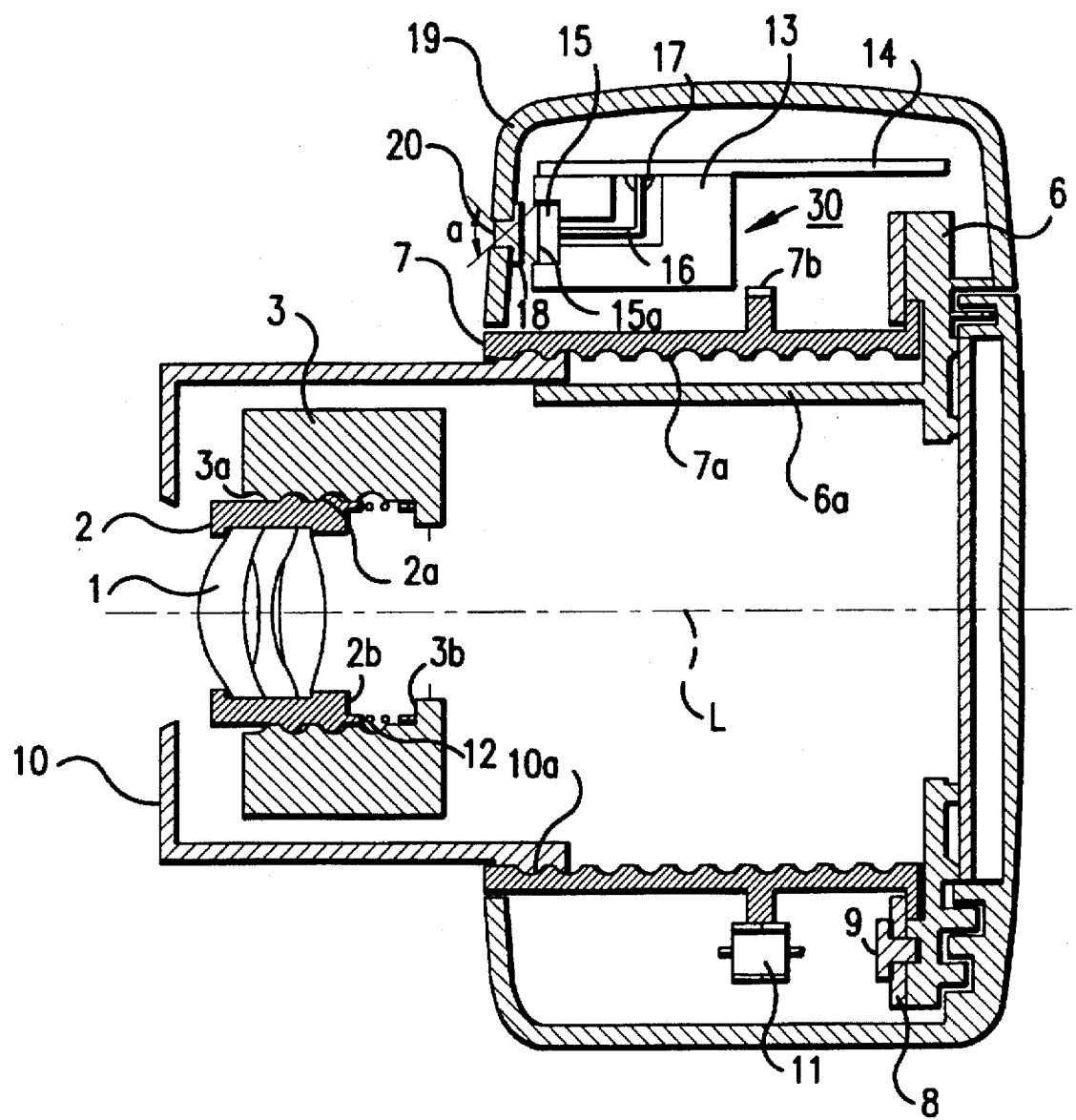
FIG. 1 is a cross-sectional view showing the structure of a primary embodiment of a camera according to the invention.

FIG. 1 is a cross-section showing the structure of a primary embodiment of a camera according to the invention. In FIG. 1, the outer shell 7 is supported by the camera body 6 and a keep plate 8, anchored by a check screw 9, in the camera body 6 so that the outer shell is free to rotate around the optical axis L. A female helicoid 7a is provided on the inside circumference of the outer shell 7 and a drive gear 7b is provided on the outer circumference of the outer shell 7. The drive gear 7b meshes with a gear 11 provided to the outside of the outer shell 7.

A male helicoid 10a is provided on the outside of the inner shell 10, the male helicoid 10a fitting together with the female helicoid 7a of the outer shell 7. Rotation of the inner shell 10 is restricted by a key 6a which extends from the camera body 6. A shutter unit 3 is anchored inside the inner shell 10. A female helicoid 3a is provided on the inside of the shutter unit 3.

In addition, a male helicoid 2a is provided on the outside of the lens support frame 2 which supports the shooting lens 1, the male helicoid 2a fitting together with the female helicoid 3a of the shutter unit 3.

A compression coil spring 12 is provided between the back edge 2b of the lens support frame 2 and the receptor 3b of the shutter unit 3, the compression coil spring 12 providing a force so that the back edge 2b of the lens support frame 2 and the receptor 3b of the shutter unit 3 are driven apart. Consequently, the lens support frame 2 is forced along the optical axis L (to the left in the figure) and play between the female helicoid 3a and the male helicoid 2a is removed.

A photometry unit 30 is provided on the inside of the housing 19 which is outside the outer shell 7, the photometric unit 30 comprises a control circuit board 14 and a photometry light-receiving element 15 and the like. The photometry light-receiving element 15 is an element which conducts photometry by receiving light that is incident from the subject field region. The photometry light receiving element 15 is positioned near the front surface of the housing 19. A block 13, solidly fixed to the camera body 6 supports the photometry light-receiving element 15. The control circuit board 14 is an electric base board which controls the camera, the circuit board being supported on the top surface of the block 13 (top being shown in FIG. 1 when the camera is held in its normal position of use). A terminal 16, which extends from the photometry light-receiving element 15, passes through the block 13 and is soldered by solder 17 to the control circuit board 14.

An aperture stop 20 is formed integrally with the housing 19 in an area positioned to the front of the photometry light-receiving element 15 in the housing 19, the aperture stop 20 comprising a light-receiving window for photometry and the stop of the photometry unit 30.

In addition, window glass 18 is adhered to the aperture stop 20 so as to cover the aperture region of the aperture stop 20 from the inside of the housing 19, the window glass 18 being made of transparent acrylic resin, for example, and formed with a cross-section that has an approximately stepped shape, having a portion within the aperture stop 20 and a portion that engages the inner surface of the housing 19. If the area of the portion of the window glass 18 that engages, and is adhered to, the inner surface of the housing 19 can be enlarged, the adhesion surface can increase. With this form, the portion that is adhered to the housing 19 is not exposed to the outside, so the external appearance of the camera is not degraded.

As shown in FIG. 1, incidental light from the region within photometry angle α, formed by the aperture region of the aperture stop 20 and the light-receiving surface 15a of the photometry light-receiving element 15, is entirely received by the photometry light-receiving element 15, by which means photometry is conducted in the subject field region.

When the gear 11 is driven to rotate by a drive motor (not shown in drawing), the outer shell 7 is caused to rotate around the optical axis L. By this means, the inner shell 10 is moves along the direction of the optical axis L because rotation of the inner shell is restricted by key 6a.

Further, the shutter unit 3 causes the lens support frame 2 to rotate in accordance with subject distance signals transmitted from a distance measuring device (not shown in drawing), focussing being accomplished by causing the shooting lens 1 to rotate around the optical axis L along the lead of the male and female helicoids 2a and 3a.

Figure 2:
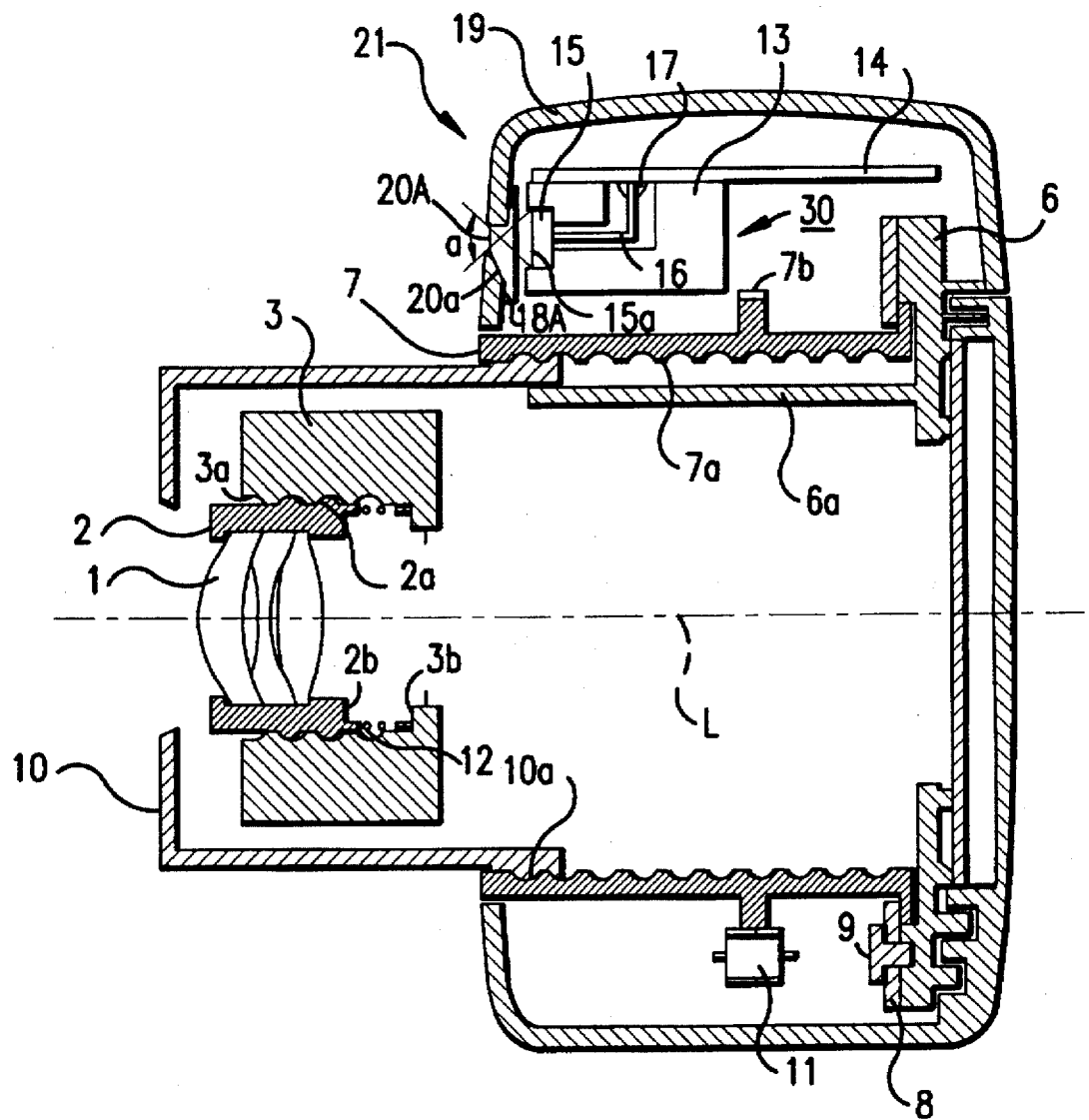
FIG. 2 is a cross-sectional view showing the structure of a second embodiment of a camera according to the invention.
Figure 3:
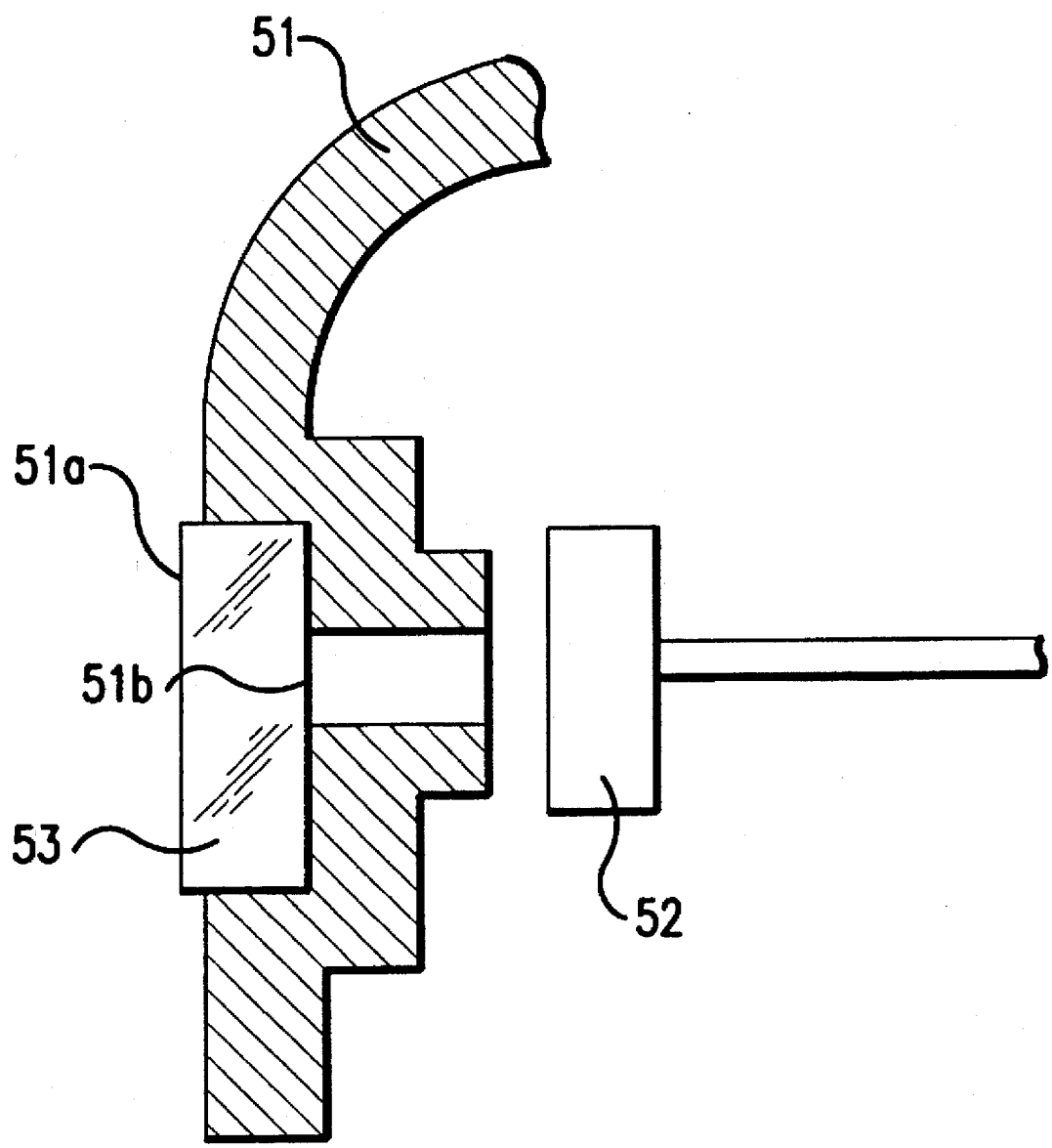
FIG. 3 is a cross-sectional view showing the structure of one type of conventional light-receiving window.

FIG. 2 is a cross section showing the structure of a second embodiment of a camera according to the invention. Hereinafter, components according to the second embodiment which are the same as components according to the primary embodiment are indicated by the same reference numbers as in the primary embodiment; hence a repeated explanation of the same has been omitted. In addition, components corresponding to components according to the primary embodiment are indicated by appending the letter A to the reference number from the primary embodiment.

In FIG. 2, the aperture stop 20A has a tapered surface 20a, the tapered surface 20a being formed so that the aperture region expands from the outside to the inside of the housing 19. It would also be appropriate for the tapered surface 20a to be formed at nearly all regions in the inner surface, or periphery, of the aperture stop 20A, or for such to be formed at a portion of the regions. Furthermore, at least one part of the tapered surface 20a is comprised of a textured, or rough processed, surface to provide a diffused reflection of the incidental light falling on the tapered surface 20a, the window glass 18A being formed so as to almost adhere to the tapered surface 20a.

The aperture stop 20A has a photometric angle α the same as that of aperture stop 20, incidental light from the region within the photometric angle α being completely received by the photometry light-receiving element 15.

In addition, as shown in FIG. 2, incidental light rays 21 from regions outside the photometric angle α are reflected by the tapered surface 20a, and as a result such do not reach the light receiving surface 15a of the photometry light-receiving element 15, and thus do not become stray light rays that have an effect on photometry. Furthermore, when these incidental light rays 21 are reflected by the textured surface of the tapered surface 20a, because of the diffused reflection, the possibility that the incidental light rays 21 will be received by the photometry light-receiving element 15 is further diminished, resulting in even greater photometry precision.

The description of the embodiments of the invention as described above is intended to be illustrative and not limiting, various changes being possible without departing from the spirit and scope of the invention.

For example, in the above embodiment, a roughened or textured surface is provided on the tapered surface 20a of the aperture stop 20A, but it is possible to obtain the same results by providing the roughened or textured surface on at least one part of the adhesion surface of the tapered surface 20a of the window glass 18A. In addition, it would also be appropriate to use a reflection-preventing coating on window glass 18 and 18A.

With a camera according to the invention, because an aperture stop is provided which combines both the photometry light-receiving window and the photometry stop, the photometry optical system can be simplified and costs can be reduced.

Furthermore, with the second embodiment, it is possible to boost photometric precision because incidental light from regions outside the photometric angle does not reach the light receptor. With the roughened or textured tapered surface, it is possible to further increase photometric precision because the incidental light is reflected even more irregularly.

It is also possible to attach the optically transparent body after securing sufficient adhesive area without degrading the external appearance of the camera.

What is claimed is:

1. A camera, comprising:

a camera housing;

a photometry unit which conducts photometry on a subject region and which is provided in the camera housing;

an aperture stop which is integrally formed with the camera housing in an area positioned to the front of the photometry unit and which acts as a stop by restricting the amount of incidental light on the photometry unit by an opening at the outer surface of the housing; and an optically transparent body that is either transparent or half-transparent mounted in the aperture stop from the inner surface of the housing, the optically transparent body passing the incidental light from within a predetermined photometry angle therethrough without altering the light path, wherein the photometry unit and the optically transparent body are arranged so that light from the subject region passes, without restriction, from the optically transparent body to the photometry unit.

2. The camera according to claim 1, wherein the aperture stop is provided with a tapered surface at at least one portion of an inner surface, the inner surface being formed so that an aperture region expands in a direction extending from an outer surface of the camera housing toward an inner surface.

3. The camera according to claim 2, wherein an irregular reflecting surface is provided on at least one portion of the tapered surface of the aperture stop.

4. The camera according to claim 2, wherein an irregular reflecting surface is provided on at least one portion of an interface between the optically transparent body and the tapered surface of the aperture stop.

5. An aperture stop for a photometry unit of a camera, comprising:

a camera housing;

an aperture integrally formed in the camera housing defines an aperture stop at an outer surface of the camera housing; and an optically transparent body mounted in said aperture, the optically transparent body having a flange, a surface of the flange opposing an inner side of the camera housing, wherein the optically transparent body passes therethrough light from within a predetermined photometry angle incident at the aperture stop without altering the light path, and wherein the optically transparent body is arranged in front of a photometry unit such that light from a subject region passes, without restriction, from the optically transparent body to the photometry unit.

6. The aperture stop according to claim 5, wherein the optically transparent body has a stepped side cross section with a front portion received in the aperture and the flange comprising a larger, rear portion abutting the inner side of the camera housing.

7. The aperture stop according to claim 6, further comprising an adhesive for adhering the larger, rear portion to the inner side of the camera housing.

8. The aperture stop according to claim 5, wherein said aperture has at least a portion of its periphery tapered so that the aperture expands from the outer side to the inner side of the camera housing.

9. The aperture stop according to claim 8, wherein the optically transparent body has a complementary tapered edge surface.

10. The aperture stop according to claim 9, wherein a one of the tapered portion of the aperture and the complementary tapered edge surface of the body has a textured surface to provide an irregular reflecting surface.

11. The aperture stop according to claim 5, wherein the optically transparent body is at least half-transparent.

12. A method of providing an aperture stop for a photometry unit of a camera, comprising the steps of:

forming a camera housing with an aperture formed therein, an opening of the aperture in an outer surface of the camera housing defining an aperture stop;

creating a transparent body having a flanged rear portion having a larger surface area than a front portion and which passes incident light without alteration of the light path;

inserting the body into the aperture from an inside of the camera housing; and adhering the body to the camera housing such that light from a subject region will pass, without restriction, from the transparent body to a photometry unit mounted in the camera housing.

13. The method according to claim 12, wherein the body is formed to have a stepped side cross section with a larger rear portion that is adhered to an inner surface of the camera housing.

14. The method according to claim 12, wherein the aperture is formed with at least a portion of an inner periphery tapering so as to expand from an outer side to an inner side of the camera housing.

15. The method according to claim 13, wherein the body is created to have an outer periphery that is complementary to the inner periphery of the aperture.

16. The method according to claim 15, further comprising the step of providing a textured surface to present an irregular reflecting surface on the tapered surface of one of the aperture and the body.

* * * * *